United States Patent
Li et al.

(10) Patent No.: US 8,286,175 B2
(45) Date of Patent: Oct. 9, 2012

(54) METHOD AND APPARATUS FOR CAPACITY OPTIMIZATION AND PLANNING IN AN ON-DEMAND COMPUTING ENVIRONMENT

(75) Inventors: Ta-Hsin Li, Danbury, CT (US); Giuseppe Andrea Palcologo, Bronx, NY (US); Stephen Scott Briggs, Pittsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 12/058,187

(22) Filed: Mar. 28, 2008

(65) Prior Publication Data

US 2008/0183543 A1 Jul. 31, 2008

(51) Int. Cl.
*G06F 9/46* (2006.01)
(52) U.S. Cl. ........ 718/104; 718/105; 709/221; 709/224; 709/229

(58) Field of Classification Search .................. 718/104, 718/105; 709/221, 224, 229
See application file for complete search history.

(56) References Cited

U.S. PATENT DOCUMENTS

| | | | |
|---|---|---|---|
| 7,281,013 B2 * | 10/2007 | Chaudhuri et al. | 707/602 |
| 7,657,501 B1 * | 2/2010 | Brown et al. | 707/999.002 |
| 2001/0039581 A1 | 11/2001 | Deng et al. | |
| 2004/0054780 A1 | 3/2004 | Romero | |
| 2004/0205120 A1 * | 10/2004 | Dar et al. | 709/203 |
| 2006/0026179 A1 * | 2/2006 | Brown et al. | 707/100 |
| 2007/0005330 A9 * | 1/2007 | Hardwick et al. | 703/22 |
| 2009/0094613 A1 * | 4/2009 | Maw et al. | 718/105 |
| 2010/0228858 A1 * | 9/2010 | Eilam et al. | 709/224 |

* cited by examiner

*Primary Examiner* — Andy Ho
(74) *Attorney, Agent, or Firm* — Whitham, Curtis, Christofferson & Cook, P.C.; Daniel P. Morris

(57) ABSTRACT

A method and apparatus are disclosed for determining the best cluster of computing resources to handle each of a plurality of workloads by optimally grouping multiple workloads and determining the best resource cluster to handle each group.

20 Claims, 8 Drawing Sheets

METHOD AND APPARATUS FOR CAPACITY OPTIMIZATION AND PLANNING IN AN ON-DEMAND COMPUTING ENVIRONMENT

BACKGROUND OF THE INVENTION

1. Field of the Invention

The present invention generally relates to use of computer resources and, more particularly, capacity optimization and planning in an on-demand computing environment.

2. Background Description

In the business of on-demand computing (or utility computing), a customer pays for what they use and the service provider is free to resell unused capacity to other customers. The resource required to handle a customer's workload is typically determined by the peak demand whereas the actual workload can fluctuate dramatically over time. A corollary to on-demand computing is that a customer with low average resource utilization would expect to save money by paying for what they use as opposed to the dedicated alternative and at the same time have the opportunity to access a pool of greater computing power for dealing with occasional surges of utilization.

The concept of creating diversified portfolios to mitigate investment risks is an age-old one in the financial industry (e.g., U.S. Pat. No. 6,292,787 B1). However, the prior art in the computer service industry focuses entirely on the determination of a proper set of servers to handle a single workload. For example, U.S. Pat. No. 5,848,270 entitled "Method and System for Determining the Performance Characteristics of a Computer System" and U.S. Pat. No. 6,571,283 B1 entitled "Method for Server Farm Configuration Optimization" describe some methods that determine the minimum amount of processor, memory, and storage required to satisfy an expected performance (e.g., target processing time, downtime, etc.) from a set of workload parameters.

What is needed is a system and method for determining not only the best set of servers to handle a single workload, but also an optimal grouping of multiple workloads and the best set of servers to handle them.

SUMMARY OF THE INVENTION

It is therefore an object of the present invention to provide a system and method for optimally grouping multiple workloads and determining the best set of servers and other computing resources (e.g. memory, disk drives) to handle them.

The choices made to deploy an on-demand utility raise some interesting and inter-related business problems: to make money in this environment implies that customers must share computing resources in a way that minimizes costs. This is called the "Portfolio Effect." Whereas today's most advanced computing technologies allow multiple workloads to share a single machine, the following questions need to be addressed to make efficient on-demand computing a reality:

Does the Portfolio Effect always exist?

Is it big enough to offset the other cost challenges and make on-demand computing a profitable business?

How many customers are required to begin enjoying a Portfolio Effect?

Is there an optimal size (in the least cost sense) for a platform to balance the number of customers required against platform costs?

Given a set of on-demand customers, is there an optimal way to group them for serving each group with a single platform?

Is there a meaningful baseline that illustrates the trade-offs between cost and risk (i.e., savings vs. risk of insufficient capacity for the customer; pricing vs. risk of underutilization for the service provider)?

Are there customers that a service provider wants to seek out and other customers to avoid?

What is the necessary information a service provider needs about a customer in order to initiate an engagement?

The present invention provides a system and method to help answer these questions, as described hereafter.

The present invention is based on a solution to the problem of finding the best mixtures for a given set of workloads that can be served satisfactorily with the minimum total hardware cost. It can be applied not only to existing customers but also to prospective customers or a combination of both. It can also incorporate hardware/software constraints such as the number of processors or the maximum number of logical partitions (LPARs) for a particular type of machine. In general, the present invention provides a solution to the problem of capacity optimization and planning for on-demand computing.

The core idea of the present invention is to regard the problem discussed above as a problem of optimal workload consolidation, i.e., consolidating a given set of multiple workloads into one or more groups, with each group being served by a single machine, so as to minimize the total requirement of computing resources. The method uses clustering algorithms to assign customer workloads to a number of servers in order to minimize the total capacity requirements and costs while maintaining the service availability level. Workloads are re-assigned on a monthly or quarterly basis.

Savings of capacity requirements can be achieved, in principle, via workload consolidation if workloads do not peak at the same time. For example, if the peaks of workload A and workload B do not occur simultaneously, then the peak of the consolidated workload will be less than the sum of the peaks. In such cases, the consolidated workload will require less computing resources because the excess resources can be re-allocated from A to B when A doesn't need them, and vise versa. By exploiting such characteristics of the workloads, the problem of workload consolidation is posed mathematically in the present invention as an optimal clustering problem: finding the best clusters for a given set of workloads that minimizes the total capacity requirements when workloads in each cluster share the same set of resources and workloads in different clusters don't. The procedure can be performed by stand-alone software or by a middleware application. The problem can be posed with or without constraints on the number of clusters and/or the maximum load in each cluster that can be handled by a dedicated server. The solution to this problem provides not only the optimal number of clusters but also the membership of each workload that can be used in actual deployment. It also provides a financial assessment for offering such service.

A case study conducted on a set of 8 customers supported by pSeries computers has shown savings on CPU requirements of 55%. Even under conservative projected savings of 40%, the overall cost savings are estimated at 15-25%. In the highly competitive hosting marketplace, these are sizable savings.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Operation of the invention will now be described with reference to a set of example workloads, such as the four shown in FIG. 1, W1 (110), W2 (120), W3 (130) and W4 (140). Each of the workloads in FIG. 1 chart CPU utilization (y axis 150) percentage over time (x axis 160; hours) and have dashed lines showing the $10^{th}$ (170), $50^{th}$ (171) and $90^{th}$ (172) percentiles, respectively. Workload could also be measured in terms of main memory, disk storage or other computing resources, but for the purposes of describing the invention it will be sufficient to consider the central processing resource.

Figure 2:
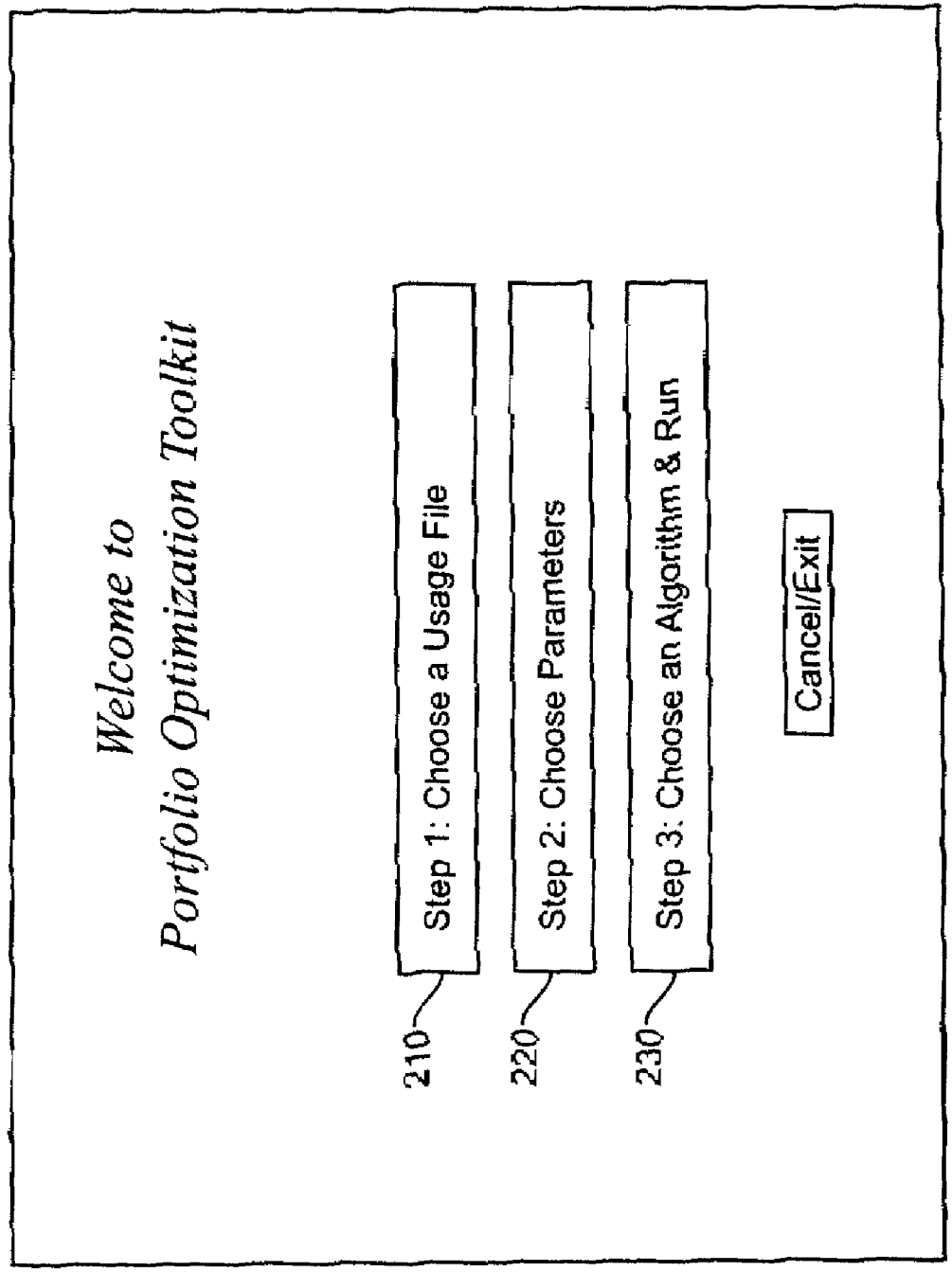
FIG. 2 is a screen shot showing the starting screen of a preferred embodiment of the invention.
Figure 3:
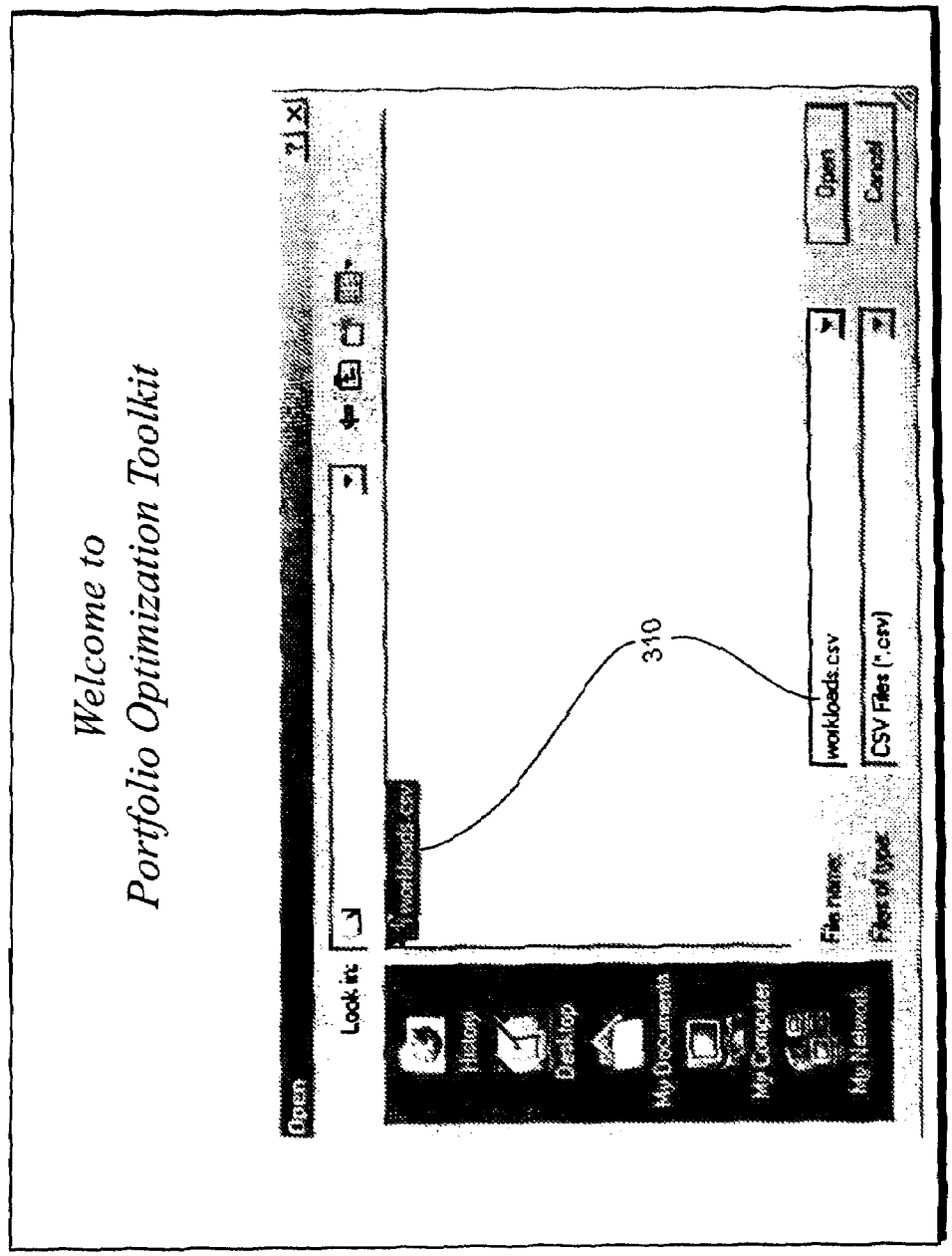
FIG. 3 is a screen shot showing the first step of the preferred embodiment where a file containing the workloads to be consolidated is chosen as input.
Figure 4:
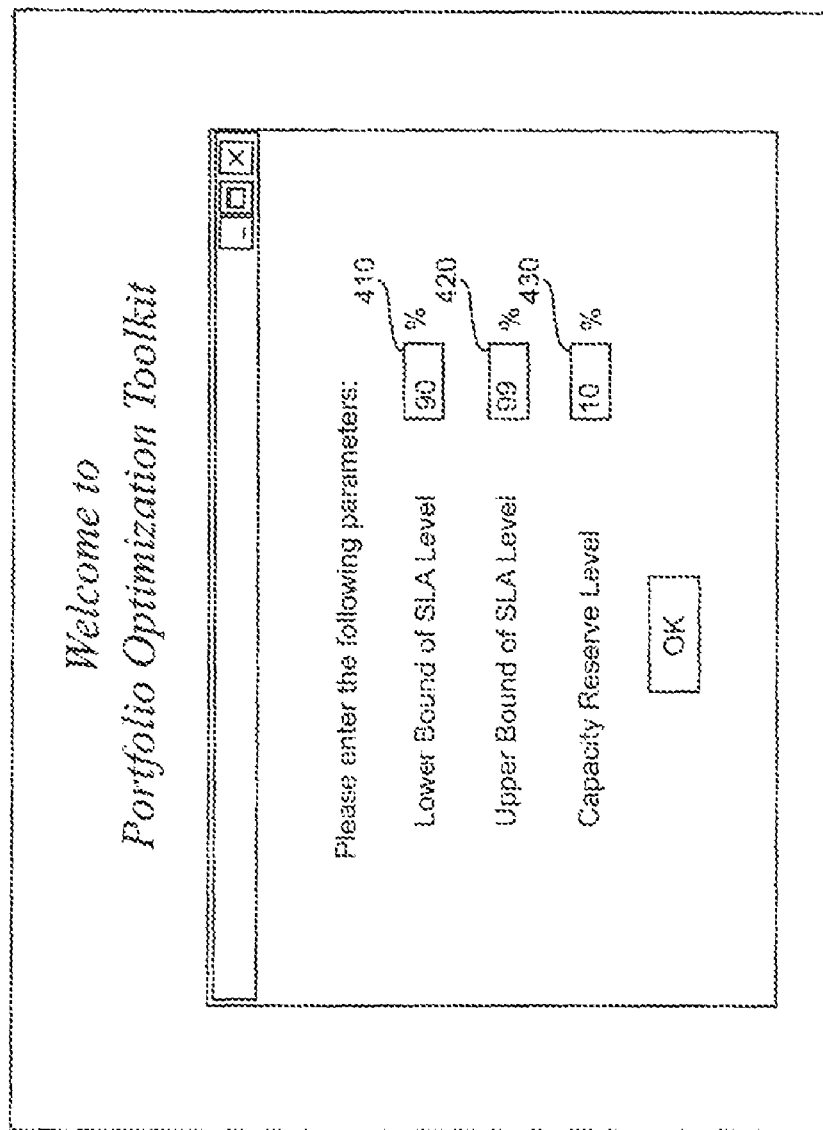
FIG. 4 is a screen shot showing the second step of the preferred embodiment where three system parameters are specified.

The initial screen for a preferred embodiment of the invention is shown in FIG. 2. In this implementation there are three steps to operation of the invention. The first step 210 is to choose a file for storage of the workloads to be consolidated. Such a file 310 is shown in FIG. 3. The next step 220 is to select parameters as shown in FIG. 4. The last step 230 is to select and run a clustering algorithm, as shown in FIG. 5.

Figure 1:
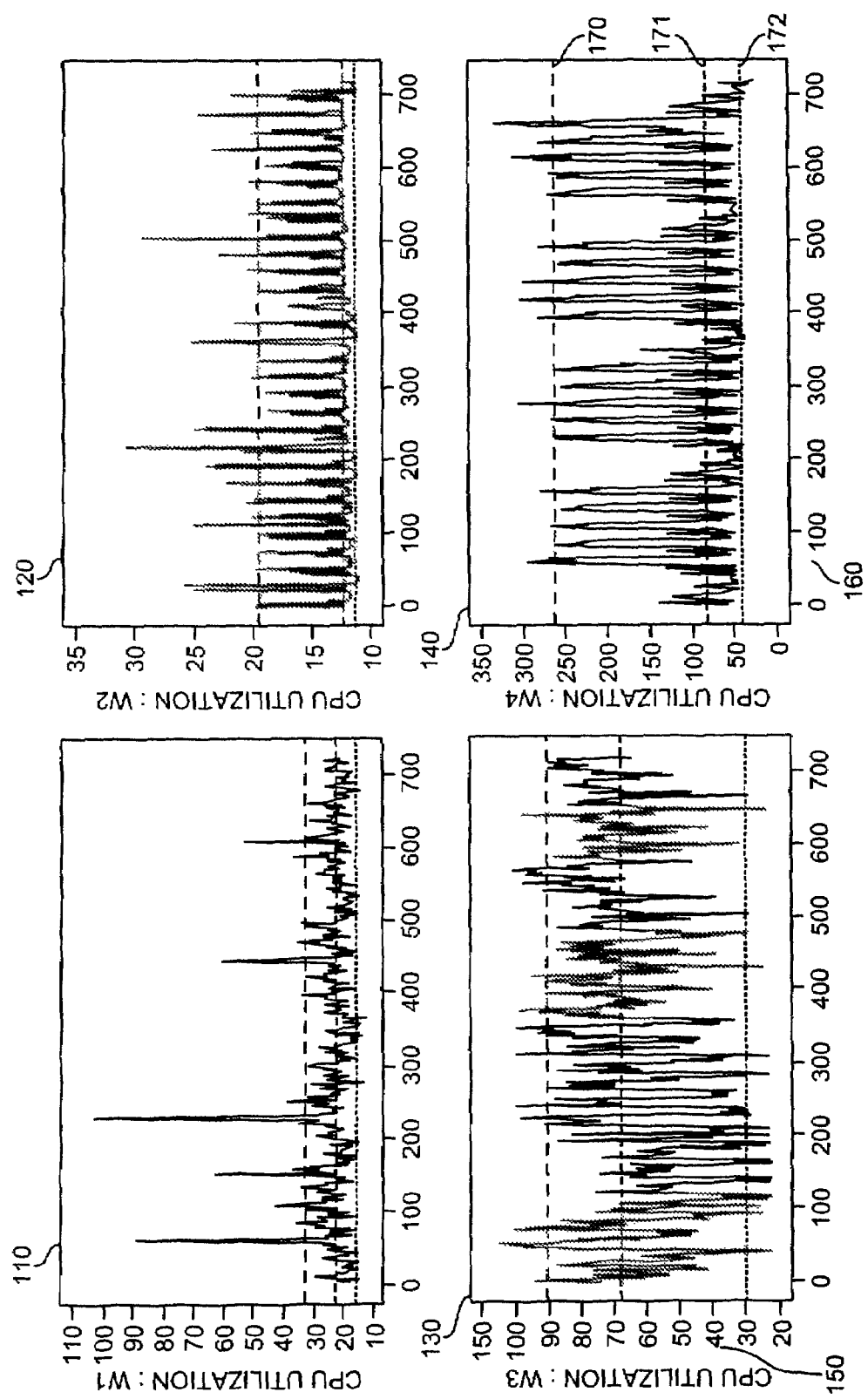
FIG. 1 contains the plot of four workload examples as functions of time.
Figure 5:
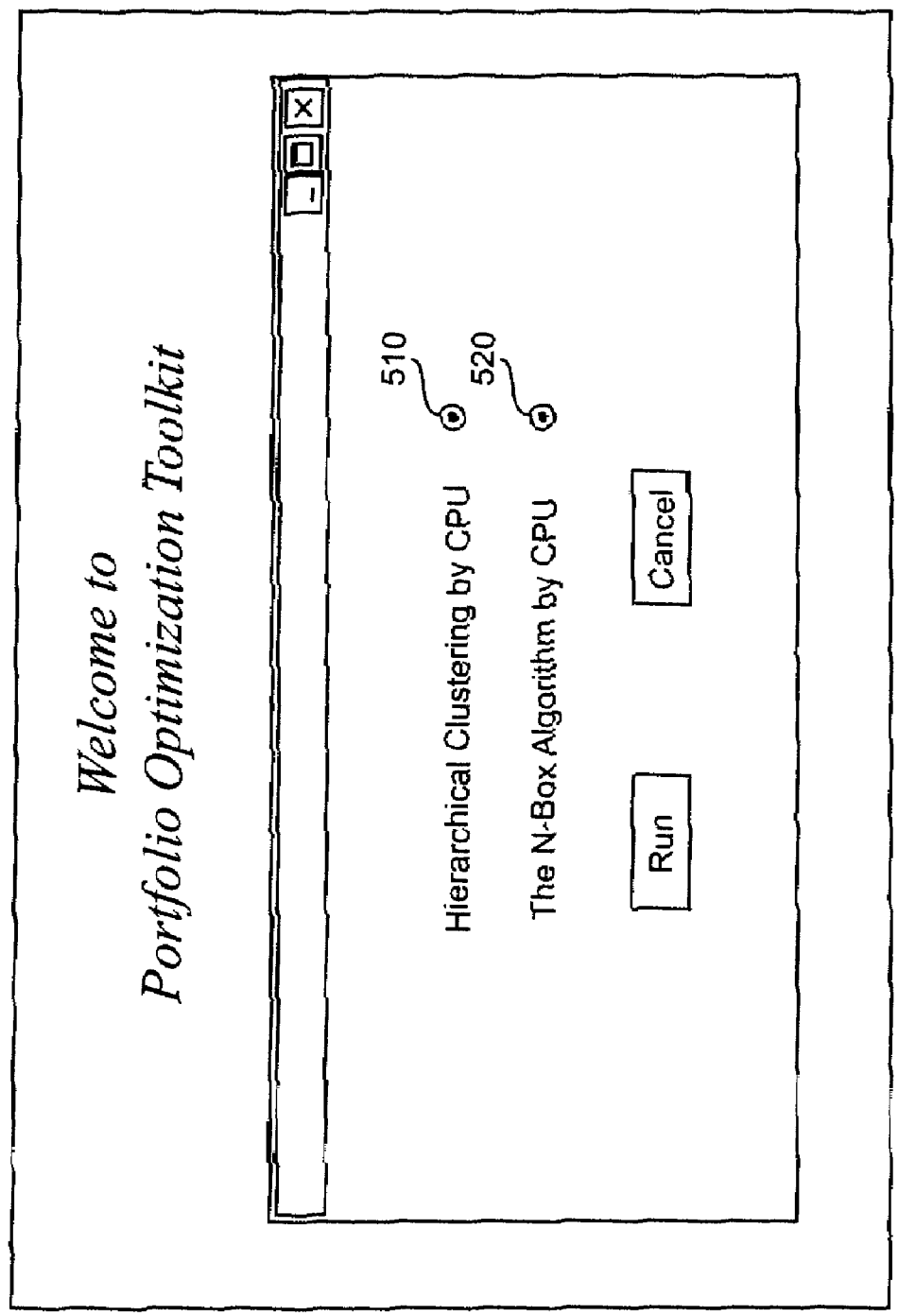
FIG. 5 is a screen shot showing the third step of the preferred embodiment where an optimization algorithm is chosen.

Given a set of measured or forecasted workloads as shown in FIG. 1, the optimization problem can be solved by iterative algorithms such as the hierarchical clustering algorithm (HCA) 510 and the N-box algorithm (NBA) 520, the two choices shown in FIG. 5. For example, HCA iteratively consolidates the best pair of available workloads (if any) that leads to the maximum reduction in the capacity requirement until no reduction can be achieved, as shown in FIG. 6 by an iterative progression from an initial assessment of each workload viewed independently (the bottom row 608, requiring a total 611 of thirteen servers for a total CPU hourly usage 612 of five hundred and sixty) to a concluding consolidation (the top row 601) showing all workloads supported by six servers and a total CPU hourly usage of 481.

Figure 6:
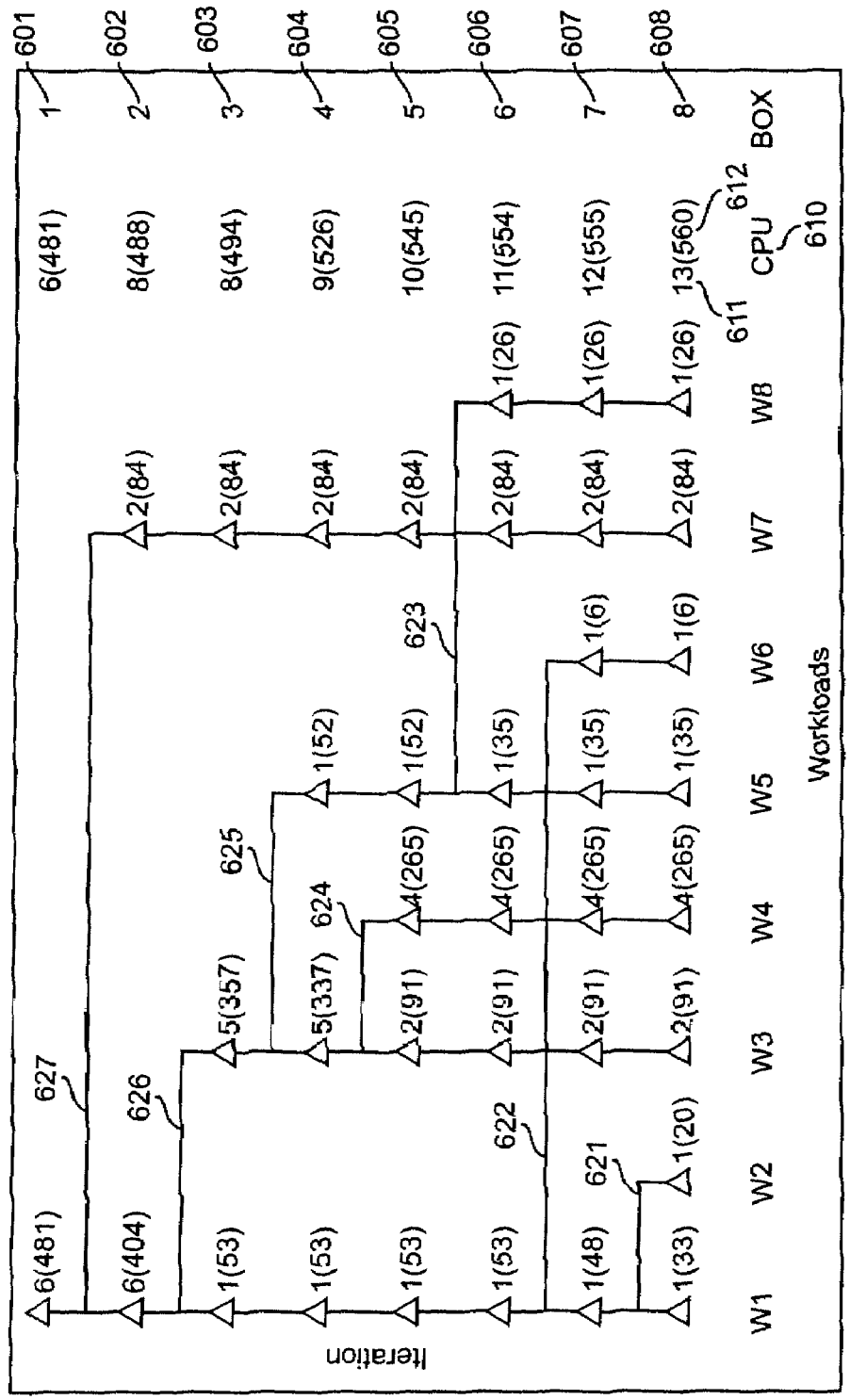
FIG. 6 is a diagram showing the optimization results of the hierarchical clustering algorithm (HCA).

The bottom row 608 in FIG. 6 contains the number of CPUs required by each workload should each of them be served by a dedicated system. The next row 607 contains the optimal portfolios and the corresponding CPU requirements after one iteration 621 where workload W1 is consolidated with workload W2 and the other workloads remain unconsolidated. This particular pair of workloads are chosen in the first iteration 621 because consolidating them yields the greatest capacity savings among all possible pairs. Note that before consolidation, workload W1 and workload W2 require one CPU each; but after consolidation one CPU is sufficient to handle the combined workload, thus saving one CPU in the entire deployment.

As the iteration proceeds, more workloads, one at a time, are consolidated in a similar way. In the second iteration 622 workload W6 is combined with workload W1+W2, as shown in row 606. In the third iteration 623 workload W8 is combined with workload W5, saving one CPU (1+1=2->1) and nine usage hours (26+35=61->52), as shown in row 605. Similar savings are achieved in the fourth iteration 624 as shown in row 604, the fifth iteration 625 as shown in row 603, the sixth iteration 626 as shown in row 602, until the last iteration 627 as shown in row 601. In the end, all workloads are consolidated into one portfolio. This turns out to be the best portfolio in this example which reduces the total number of CPUs (shown in the CPU column 610) from 13 to 6 and the total hourly CPU usage from 560 to 481.

NBA takes N anchor workloads specified by the user and consolidates each remaining workload with the best anchor; then it iteratively swaps the best pair of workloads from different groups (if any) that yields the maximum reduction in the capacity requirement until no further consolidation can be done.

These algorithms are similar in spirit to the classical algorithms for clustering points in a Euclidean space. The key difference is that the present invention employs the capacity requirement of a consolidated workload as the optimization criterion, whereas the classical clustering algorithms use the Euclidean distance to the centroid of a cluster, which is totally meaningless in the workload consolidation problem. What NCA and NBA require is a mapping of the form f(X,Y,alpha,beta) which maps any given workloads X and Y, with given parameters alpha and beta, into the number of CPUs required to handle both X and Y combined.

Key parameters in the optimization problem include the system availability level alpha and the capacity reserve level beta 430, as shown in FIG. 4. In a typical on-demand environment, each customer will have a Service Level Agreement (SLA) specifying a resource capacity that the provider agrees to make available to the customer. The parameters specified, as shown in FIG. 4, set a lower bound 410 and an upper bound 420 for the percentage of the resource capacity required under the SLA agreement for each of the workloads being optimally clustered. The alpha specifies the capacity availability to the customer (as shown by the SLA parameter in FIG. 4) and the beta specifies the system overhead incurred in a shared platform and the reserved capacity buffer to handle unexpected workload spikes. A simple example of the availability level alpha is the probability that the allocated capacity (minus the capacity reserve) is greater than the workload. For a given workload, the lower is alpha, the higher is the capacity requirement and hence the hardware cost. Similarly, the higher is beta, the less is the usable capacity and hence the higher is the capacity requirement. These parameters should be chosen properly in configuring an on-demand utility based on the service level agreement (if any) and the types of machines used.

Figure 7:
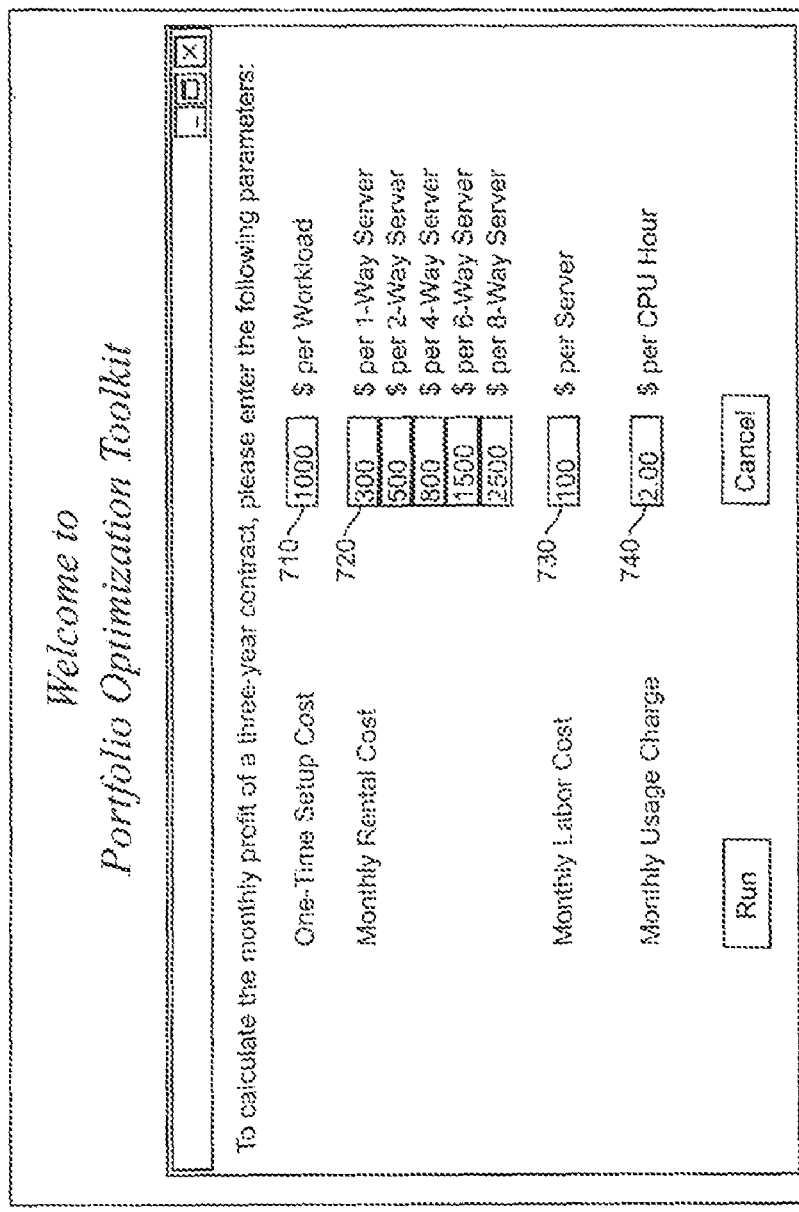
FIG. 7 is a screen shot showing the inputs to the profit analysis procedure of the preferred embodiment.
Figure 8:
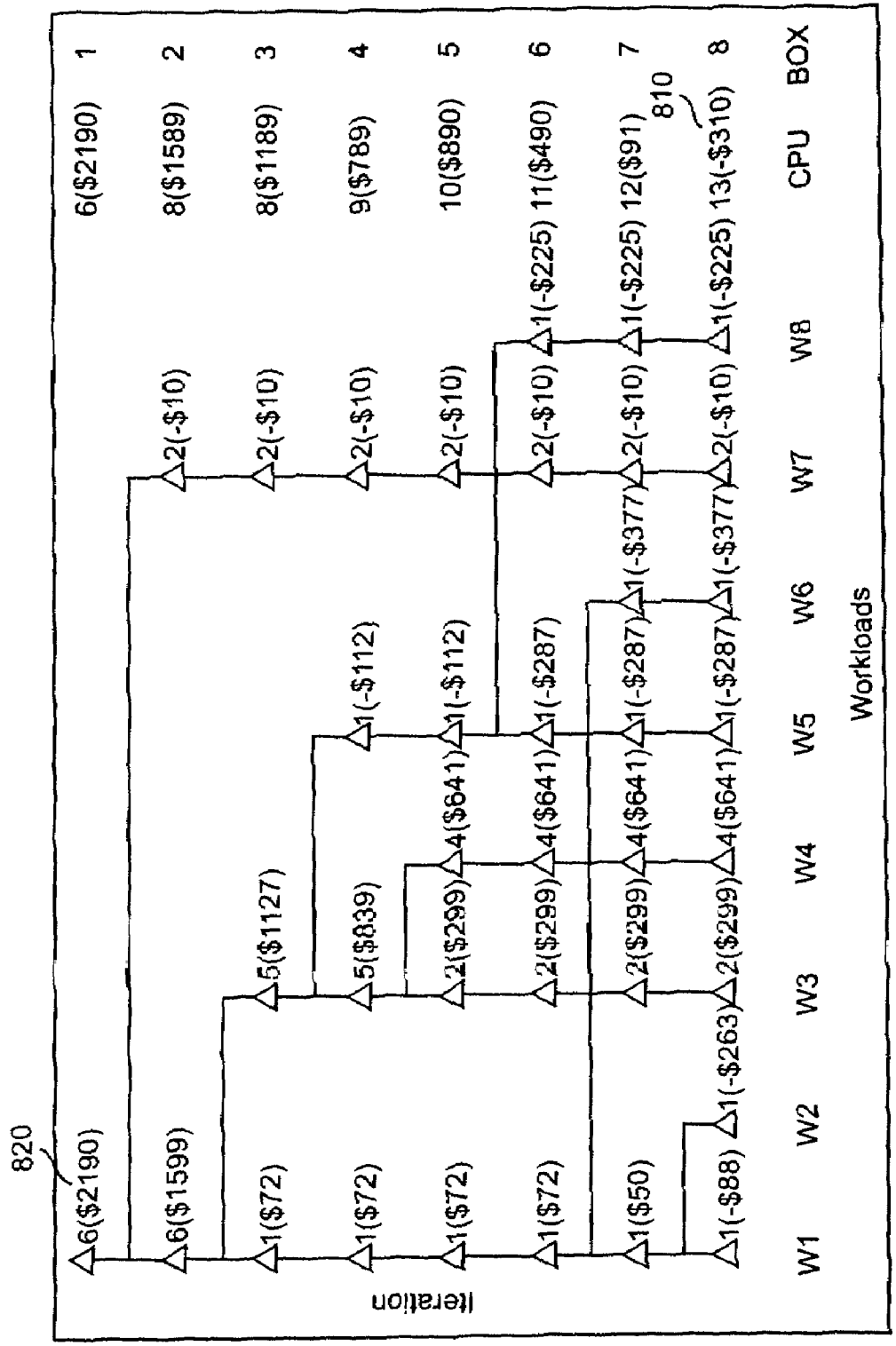
FIG. 8 is a diagram showing the results of profit analysis for the optimal portfolios shown in FIG. 6 using the parameters shown in FIG. 7.

Once the optimal consolidation plan is obtained, the associated cost and the profit potential can be analyzed as shown in FIG. 8, on the basis of hardware/software costs, labor costs, and pricing policies as shown in FIG. 7. In the example shown in FIG. 7, the financial model is based on a three-year service contract under which the customer pays an hourly rate for actual usage plus an installation fee charged on a monthly basis over the course of the contract. The cost of hardware is also calculated on a monthly basis. The appropriate charges for a given implementation under the financial model shown in FIG. 7 are entered as setup cost 710 for each workload, monthly rental cost 720, monthly labor costs 730, and the rate charged for actual usage 740. FIG. 8 shows that the optimal portfolio obtained by HCA in FIG. 5 turns a monthly loss 810 of $310 into a monthly profit 820 of $2190.

It will be observed that while the above description is in terms of servers, the invention can be applied to other types of computing resources such as memory and disk space requirements.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for optimizing computing resources used by on-demand customers, comprising the steps of:
   storing in a computer database representations of a workload of each of a plurality of customers, each said workload being represented in terms of usage measures of a particular computing resource over a time period;
   storing in a computer database, for each of said customer workloads, one or more parameters describing performance levels to be met by said particular computing resource, said performance levels being a function of said usage measures over said time period;
   running an algorithm on said workloads, said algorithm optimizing usage of said particular computing resource, constrained by said performance levels, by grouping said plurality of customer workloads into groups, each group being served by a different cluster of one or more instances of said particular computing resource, wherein workloads in each cluster share the same resources and workloads in different clusters do not share resources.

2. A method as in claim 1, wherein said particular computing resource is a central processing unit.

3. A method as in claim 1, wherein said parameters are obtained by displaying for a user a dialog specifying each of said parameters and receiving from said user a value for each of said specified parameters.

4. A method as in claim 3, wherein said specified parameters are upper and lower bounds and a capacity reserve level for performance of a service level agreement applicable to said customer with respect to said particular computing resource.

5. A method as in claim 1, wherein said algorithm is selected by a user from a dialog displaying alternatives for said optimizing.

6. A method as in claim 5, wherein said algorithm dialog displays a choice between hierarchical clustering and N-Box algorithms.

7. A method as in claim 6, wherein for each algorithm there is displayed a choice between optimizing the number of clusters or optimizing the total capacity of the instances of the particular computing resource.

8. An apparatus for optimizing computing resources used by on-demand customers, comprising:
   means for storing in a computer database representations of a workload of each of a plurality of customers, each said workload being represented in terms of usage measures of a particular computing resource over a time period;
   means for storing in a computer database, for each of said customer workloads, one or more parameters describing performance levels to be met by said particular computing resource, said performance levels being a function of said usage measures over said time period;
   means for running an algorithm on said workloads, said algorithm optimizing usage of said particular computing resource, constrained by said performance levels, by grouping said plurality of customer workloads into groups, each group being served by a different cluster of one or more instances of said particular computing resource, wherein workloads in each cluster share the same resources and workloads in different clusters do not share resources.

9. An apparatus as in claim 8, wherein said particular computing resource is a central processing unit.

10. An apparatus as in claim 8, wherein said parameters are obtained by displaying for a user a dialog specifying each of said parameters and receiving from said user a value for each of said specified parameters.

11. An apparatus as in claim 10, wherein said specified parameters are upper and lower bounds and a capacity reserve level for performance of a service level agreement applicable to said customer with respect to said particular computing resource.

12. An apparatus as in claim 8, wherein said algorithm is selected by a user from a dialog displaying alternatives for said optimizing.

13. An apparatus as in claim 12, wherein said algorithm dialog displays a choice between hierarchical clustering and N-Box algorithms.

14. An apparatus as in claim 13, wherein for each algorithm there is displayed a choice between optimizing the number of clusters or optimizing the total capacity of the instances of the particular computing resource.

15. A computer implemented system for optimizing computing resources used by on-demand customers, comprising:
   first computer code for storing in a computer database representations of a workload of each of a plurality of customers, each said workload being represented in terms of usage measures of a particular computing resource over a time period;
   second computer code for storing in a computer database, for each of said customer workloads, one or more parameters describing performance levels to be met by said particular computing resource, said performance levels being a function of said usage measures over said time period;
   third computer code for running an algorithm on said workloads, said algorithm optimizing usage of said particular computing resource, constrained by said performance levels, by grouping said plurality of customer workloads into groups, each group being served by a different cluster of one or more instances of said particular computing resource, wherein workloads in each cluster share the same resources and workloads in different clusters do not share resources.

16. A computer implemented system as in claim 15, wherein said particular computing resource is a central processing unit.

17. A computer implemented system as in claim 15, wherein said parameters are obtained by displaying for a user a dialog specifying each of said parameters and receiving from said user a value for each of said specified parameters.

18. A computer implemented system as in claim 15, wherein said algorithm is selected by a user from a dialog displaying alternatives for said optimizing.

19. A computer implemented system as in claim 18, wherein said algorithm dialog displays a choice between hierarchical clustering and N-Box algorithms.

20. A computer implemented system as in claim 19, wherein for each algorithm there is displayed a choice between optimizing the number of clusters or optimizing the total capacity of the instances of the particular computing resource.

* * * * *